INVENTORS
DOUGLAS R.M. LAMBERT
JOSEPH M. SHARKEY

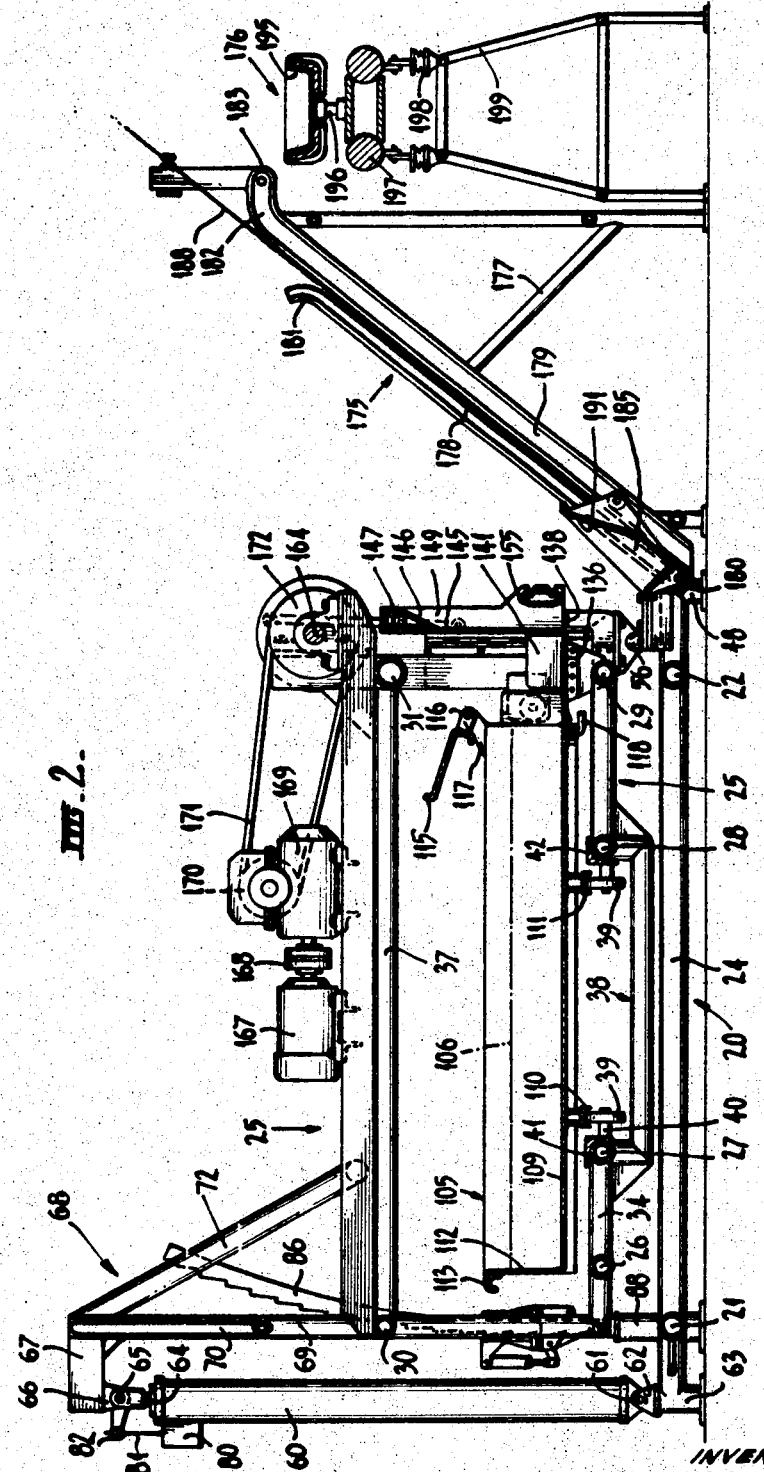

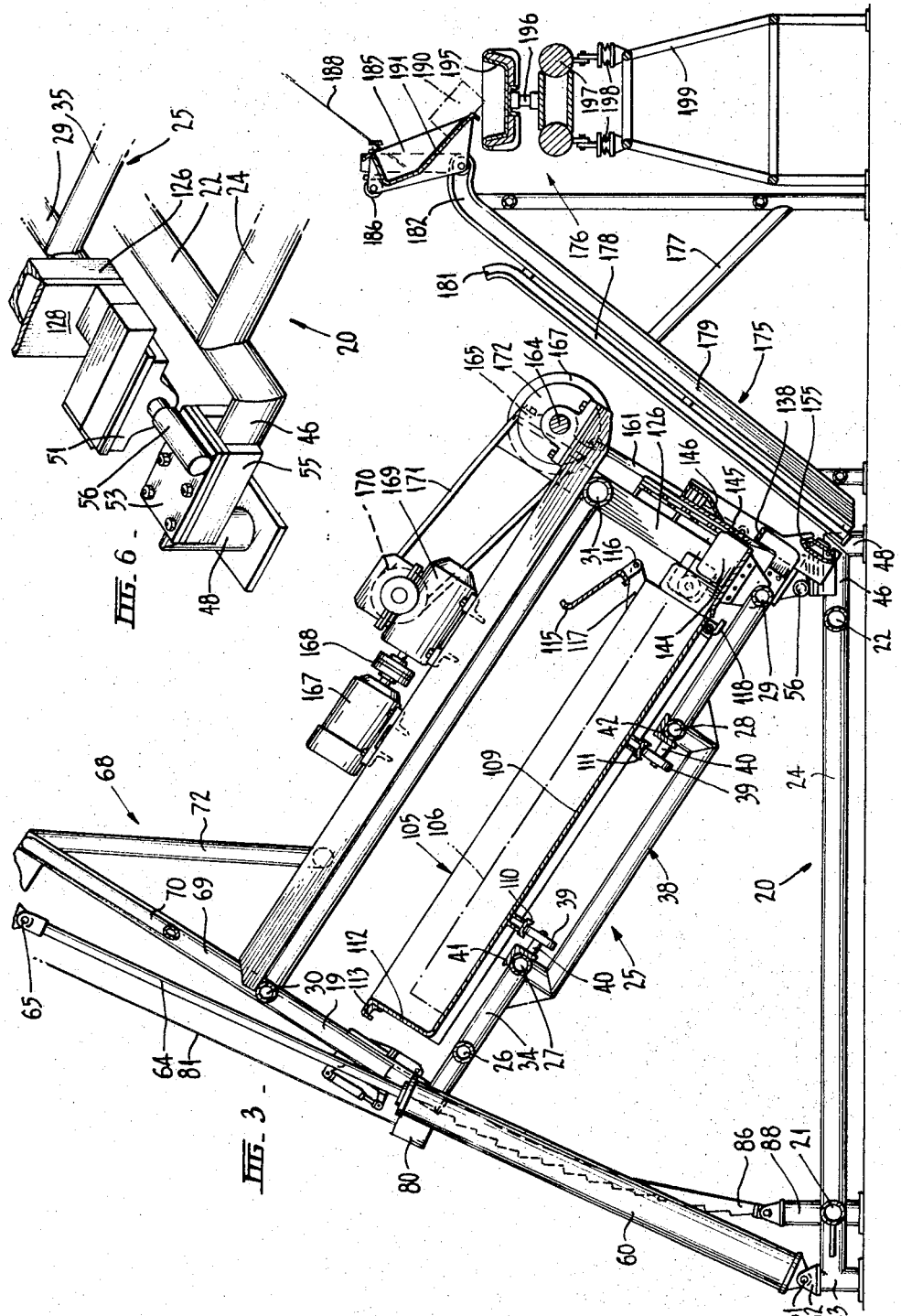

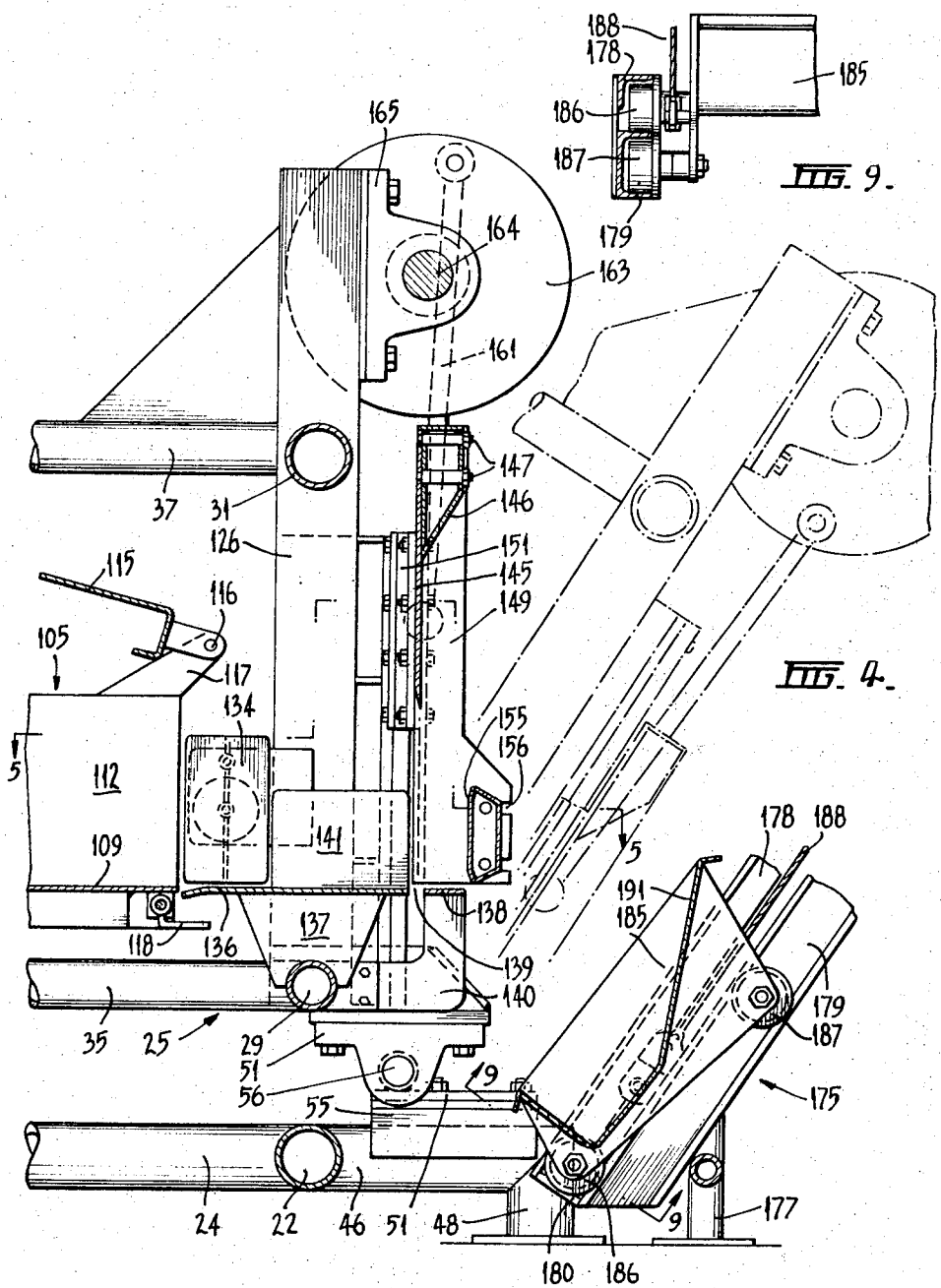

Nov. 21, 1967     D. R. M. LAMBERT ET AL     3,353,269
METHOD OF AND APPARATUS FOR HANDLING CHEESE CURD
Filed Nov. 16, 1964
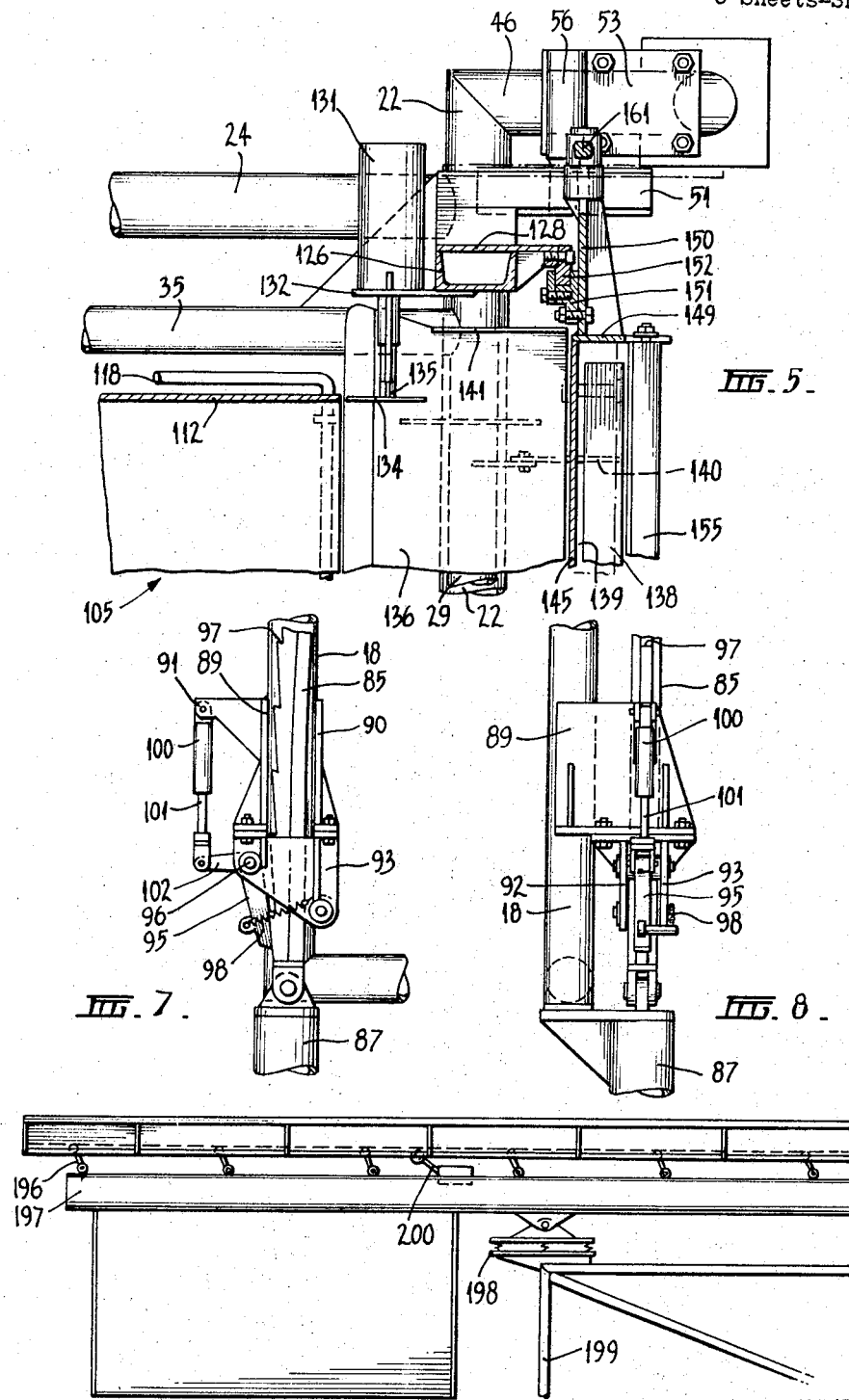
INVENTORS
DOUGLAS R.M. LAMBERT
JOSEPH M. SHARKEY
BY Anderson, Luedeka, Fitch, Even & Tabin
ATTORNEYS

United States Patent Office

3,353,269
Patented Nov. 21, 1967

3,353,269
METHOD OF AND APPARATUS FOR HANDLING CHEESE CURD
Douglas R. M. Lambert, Caulfield, Victoria, and Joseph M. Sharkey, Box Hill, Victoria, Australia, assignors, by mesne assignments, to National Dairy Products Corporation, New York, N.Y., a corporation of Delaware
Filed Nov. 16, 1964, Ser. No. 411,523
Claims priority, application Australia, Oct. 6, 1964, 50,123/64
14 Claims. (Cl. 31—5)

This invention relates to an improved method and apparatus for handling cheese curd, and refers especially to a method and apparatus for severing strips or ribbons of curd from a block of cheese curd and for conveying the severed curd strips to a milling machine.

The invention is concerned particularly, but is not limited, to the handling of blocks of cheese curd which have been produced by the method and apparatus described in our copending application Ser. No. 403,993 and in United States Patent No. 3,292,259, issued Dec. 2, 1966. These blocks are contained in forming trays or similar open-topped receptacles supported on a conveyor extending from the apparatus in which the curd is formed.

An object of the invention is to provide an apparatus whereby blocks of cheese curd may be subdivided into strips or ribbons and the curd strips so formed conveyed and fed to a milling machine or like apparatus, in a continuous and efficient manner and with a minimum of labor and without any manual handling of the curd.

A further object is to provide a continuous method for cutting a block of cheese curd into a plurality of strips.

A method of handling cheese curd according to one broad form of the invention comprises tilting a block of cheese curd to an inclined position, effecting limited lateral movement of the block, arresting the lateral movement of the block, and severing a strip or ribbon of curd from the block.

More particularly, the curd block is formed by delivering a curd mass to a rectangular tray or like receptacle, which may be a forming tray as described in the aforementioned application Ser. No. 403,993, and by compressing and compacting the mass within the tray so as to cause it to assume the shape of the tray. The tray is tilted to a degree sufficient to cause the curd block to slide bodily on the floor of the receptacle towards and through the lower open side thereof but not sufficient to cause substantial distortion or lifting of the curd block. The angle of tilting of the block is preferably between 35° and 45°. The block is initially caused to move laterally and downwardly a distance greater than the width of the curd strip to be severed from the block, the lateral and downward movement of the block being then arrested (as by a stop), and a strip or ribbon of curd is then severed from the portion of the curd block which projects through the open side of the receptacle, preferably by means of a downwardly descending knife or guillotine blade. The severed strip of curd is then preferably transferred by gravity into an elevating mechanism and is then elevated and transferred from the elevating mechanism into a conveyor by which it is conveyed to a milling machine or the like. This procedure is repeated so as to sever further strips from the curd block.

Apparatus for handling cheese curd according to one form of the invention comprises a receptacle for containing a block of curd, means for opening one side of the receptacle, means for tilting the receptacle so that the open side is lowermost, stop means for arresting the lateral and downward movement of the curd block, and means for severing a strip or ribbon of curd from the block.

The receptacle for the curd block may comprise an open-topped tray of square or rectangular shape in plan, one side of which is hinged so that it can be swung upwardly to permit the block to slide laterally under gravity through the open side of the receptacle when the latter is tilted to a predetermined angle.

Preferably the receptacle is delivered from a conveyor onto a guillotine frame which is tiltably mounted on a fixed supporting frame, the guillotine frame being tilted by means of an air cylinder or other suitable means about a pivot point which is located in proximity to and below the point at which the curd strip is severed from the block.

A curd support or guide plate is preferably provided on the tiltable frame to receive and support the portion of the curd block which projects laterally and downwardly through the open side of the receptacle after the curd block has moved laterally in the receptacle, and a stop member is provided to engage the lowermost side face of the block and thereby prevent further lateral movement of the block. A guillotine knife or cutting blade is mounted on the tiltable frame so as to be capable of upward and downward movement in a direction at right angles to the curd support or guide plate, and a recess or slot is formed in the curd support or guide plate to receive the knife or blade when it descends. Power actuated mechanism is provided to raise and lower the guillotine knife, and guide means are preferably provided for the said knife.

The stop member is preferably connected to the said knife so as to be raised and lowered therewith, the stop member being located so as to engage the curd block when the knife is in its uppermost position and being lowered with the knife so that the curd strip is free to move laterally by gravity above the stop member after being severed from the block. When the knife is raised, the stop member is returned to its previous position so as to engage the side face of the block when a further lateral movement of the latter occurs.

The severed curd strip is preferably delivered by gravity into a skip or bucket of a skip hoist and is elevated by said hoist and then delivered by gravity onto a vibratory conveyor by which it is conveyed to a milling machine. The intermittent delivery of curd strips from the skip hoist or elevator onto the vibratory conveyor is converted by the latter into a continuous and even delivery of curd into the milling machine.

Other objects and features of the invention will be apparent from the ensuing description of the preferred form of the invention illustrated in the accompanying drawings, wherein:

FIGURE 2 is a view in sectional elevation of the apparatus shown in FIGURE 1;

FIGURE 3 is a view in sectional elevation similar to FIGURE 2, showing the guillotine frame in its tilted position;

FIGURE 4 is a view in sectional elevation on an enlarged scale, taken on the line 4—4 of FIGURE 1;

FIGURE 5 is a view in sectional plan, also on an enlarged scale, taken on the line 5—5 of FIGURE 4;

FIGURE 6 is a fragmentary perspective view, on an enlarged scale, of one of the pivot mountings of the tiltable frame;

FIGURE 7 is a view in elevation, on an enlarged scale, taken on the line 7—7 of FIGURE 1;

FIGURE 8 is a view in elevation of the mechanism shown in FIGURE 7, taken at right angles to FIGURE 7;

FIGURE 9 is a view taken on the line 9—9 of FIGURE 4; and

FIGURE 10 is a view in elevation taken on the line 10—10 of FIGURE 1.

Figure 1:
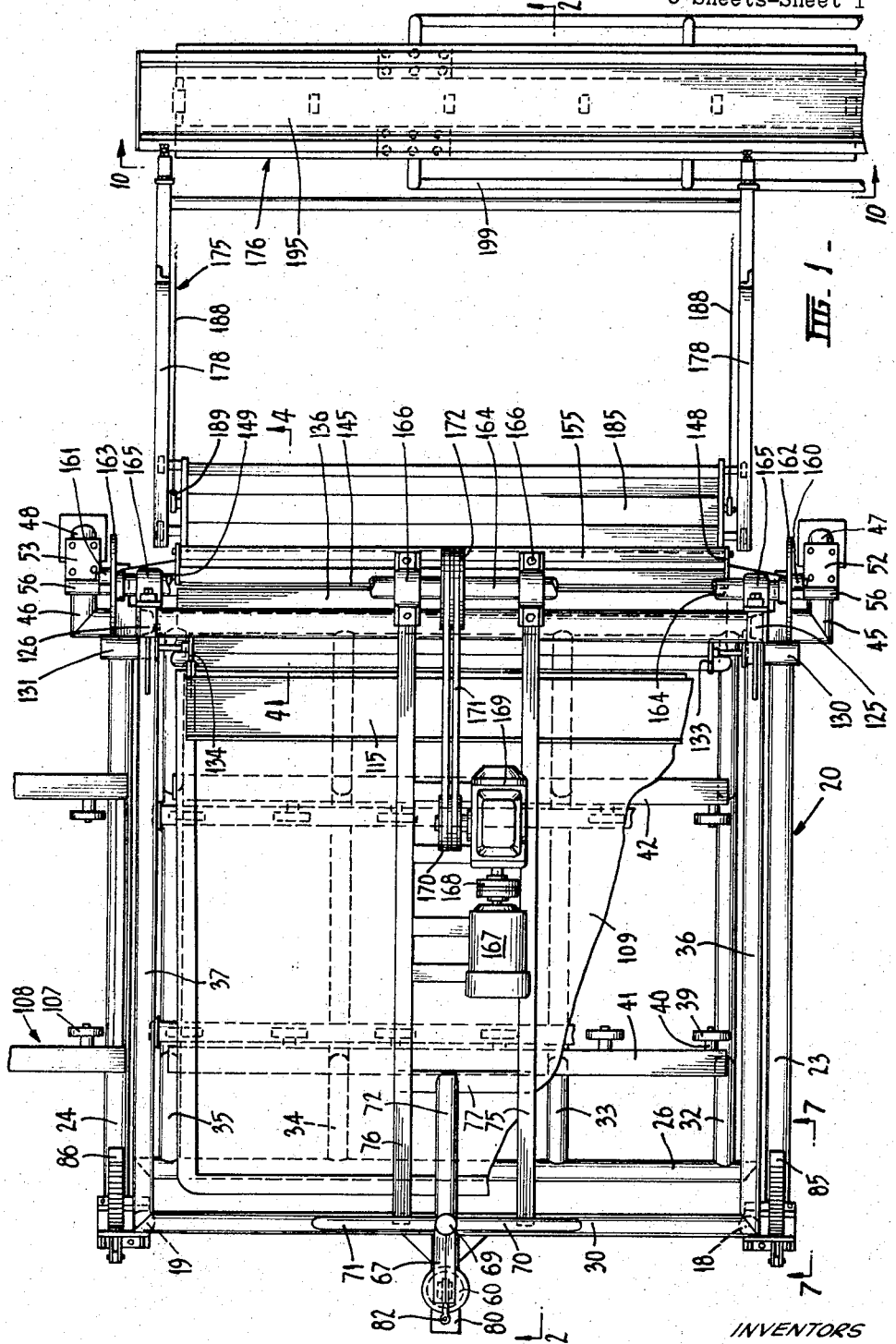
FIGURE 1 is a plan view, partly broken away, of apparatus for handling cheese curd according to this invention.

Referring now to the drawing, there is shown a specific embodiment of the invention wherein the reference numeral 20 indicates a fixed base frame which comprises longitudinal members 21, 22 and transverse members 23, 24 (FIGS. 1 and 2).

A tiltable frame 25 is pivoted at the fixed base frame 20 and comprises lower longitudinal members 26, 27, 28 and 29, upper longitudinal members 30, 31, lower transverse members 32, 33, 34, 35, upper transverse members 36, 37, and vertical members 18, 19. Each of the lower transverse members 32, 33, 34, 35 is dished downwardly as shown at 38 to accommodate rollers 39 rotatably mounted on spindles 40 secured to longitudinal angle members 41, 42 which are secured to the longitudinal members 27, 28.

The fixed frame 20 is provided at each side with extension members 45, 46 which are connected at their ends to the ends of the longitudinal member 22 of the fixed frame 20 and to vertical supports 47, 48. The tiltable frame 25 is pivoted to the fixed frame 20 by means of bearings 50, 51 (FIGS. 3 and 4) secured to the transverse members 32, 35 of the tiltable frame and by trunnions 52, 53 secured to brackets 54, 55 mounted on the extension members 45, 46, the bearings 50, 51 being pivotally connected to the trunnions 52, 53 by pivot pins 56. The pivot pins 56 are located vertically beneath the knife or cutting blade when the tiltable frame 25 is in its lowermost or horizontal position.

The mechanism for raising and lowering the tiltable frame 25 comprises an air cylinder 60 which is pivoted at its lower end at 61 to a bracket 62 secured to an extension 63 of the fixed frame 20. The piston rod 64 of the air cylinder 60 is pivoted at its upper end at 65 to a bracket 66 secured to an arm 67 mounted on a frame 68 which is secured to the tiltable frame 25. The frame 68 comprises a vertical member 69, bracing members 70, 71 (FIG. 1) secured at their lower ends to the upper longitudinal member 30 of the tiltable frame 25, and a bracing member 72. Transverse members 75, 76 are mounted on the tiltable frame 25 and are secured at their ends to the upper longitudinal members 30, 31. The lower end of the bracing member 72 of the frame 68 is secured to a short longitudinal member 77 which extends between and is secured to the transverse members 75, 76.

A positional controller 80 is mounted on the upper end of the air cylinder 60 and a flexible cam 81 of the positional controller 80 is connected at its upper end to an arm 82 secured to the upper end of the piston rod 64 of the air cylinder 60. The positional controller 80 serves to maintain the tiltable frame 25 at the same angle of inclination relative to the fixed frame 20 irrespective of variations in the load on the tiltable frame 25 during operation of the apparatus.

A safety device is provided for holding the tiltable frame 25 in its elevated position in the event of failure of the air pressure to the air cylinder 60. This safety device comprises two arcuate ratchet members 85, 86 pivoted at their lower ends to fixed members 87, 88 secured to the fixed frame 20 at opposite ends thereof.

The ratchet mechanism associated with the ratchet member 85 is shown in FIGURES 7 and 8 and comprises plates 89, 90 secured to the vertical member 18 and between which the ratchet member 85 is vertically movable. A laterally extending flange 91 is formed on the plate 89 and brackets 92, 93 are secured to the plates 89, 90 therebeneath. A pawl 95 is pivoted at 96 to the brackets 92, 93 and is adapted to engage the ratchet teeth 97 of the ratchet member 85. A tension spring 98 extends between the pawl 95 and a point on the bracket 93 and urges the pawl 95 towards the ratchet member 85. The pawl 95 is moved out of engagement with the ratchet member 85 by means of an air cylinder 100 which is pivoted at its upper end to the flange 91, the piston rod 101 of the air cylinder 100 being pivoted at its lower end to an arm 102 connected to or formed integrally with the pawl 95. The pawl 95 engages the teeth 97 of the ratchet member 85 as the tiltable frame 25 is raised and the said ratchet devices thus prevent accidental lowering of the tiltable frame 25 from any position to which it has been elevated. When lowering of the tiltable frame is required, the air cylinder 100 is operated to release the pawl 95 from the ratchet member 85. A similar ratchet mechanism is provided in association with the ratchet member 86.

A tray or curd receptacle 105 which is of substantially square shape in plan and which contains a block 106 of cheese curd is conveyed to the apparatus on the rollers 107 of a roller conveyor 108 (FIG. 1) and is received within the tiltable frame 25, the floor or bottom 109 of the tray 105 being provided on its lower surface with rails 110, 111 (FIGS. 2 and 3) which engage the rollers 107 of the conveyor 108 and the rollers 39 mounted on the tiltable frame 25. The tray 105 is provided with three fixed substantially vertical walls 112, the upper edges of which are flanged as shown at 113 for strengthening purposes. The fourth wall or door 115 of the tray 105 is hinged at 116 to brackets 117 secured to the end walls 112 of the tray and is capable of being pivoted to the open or upper position shown in FIGURES 2, 3 and 4 or to a closed or lower position (not shown) in which the hinged wall or door 115 is held closed by means of a catch 118.

The tiltable frame 25 is provided with vertical members which comprise vertical channel-section members 125, 126 and vertical plates 127, 128 (FIG. 5). Air cylinders 130, 131 are supported on brackets 132 secured to the channel members 125, 126 and vertical shaping plates 133, 134 are secured to the piston rods 135 of the air cylinders 130, 131. The shaping plates 133, 134 are normally retracted by means of the air cylinders 130, 131 to facilitate transverse movement of the curd block 106 in the tray 105, and after such transverse movement has occurred, the shaping plates 133, 134 are moved towards one another by the air cylinders 130, 131 in order to engage and re-shape the laterally projecting portion of the curd block 106. The shaping plates 133, 134 are maintained in engagement with the projecting portion of the block 106 until the guillotine knife descends, as hereinafter described. When the guillotine knife is again raised, the shaping plates 133, 134 are again retracted to permit a further transverse movement of the curd block 106.

A guide plate 136 (FIGURE 4) for supporting the curd block 106 as it is moved transversely from the tray 105 is disposed adjacent to the open side of the tray 105 and is supported on brackets 137 mounted on the longitudinal member 29 of the tiltable frame 25. Fixed vertical guide plates 141 are secured to the ends of the guide plate 136 and serve to guide the end faces of the curd block 106 towards the guillotine knife 145 if the curd block 106 spreads sufficiently to engage the said guide plates 136. A curd support 138 is disposed parallel to the guide plate 136 and is separated therefrom by a narrow slot 139. The upper surfaces of the curd support 138, of the guide plate 136 and of the floor 109 of the tray 105 are in linear alignment with one another, so that the curd block 106 may slide readily thereover. The support 138 is secured to L-shaped brackets 140 connected to the longitudinal member 29. It will be appreciated that if desired, the guide plate 136 and the curd support 138 may be formed as a single unit having a slot 139 formed therein.

The curd severing or cutting mechanism comprises a guillotine knife or cutting blade 145, the lower edge of which is provided with a knife edge and the upper part of which is strengthened by means of a reinforcing plate 146 secured to the knife 145 by bolts 147 (see FIGURE 4). The ends of the knife 145 are secured to transverse end plates 148, 149 to which are secured longitudinal walls 112 of the tray 105 by the guide plates 133, 134 actuated by the air cylinders 130, 131.

The knife 145 is then moved downwardly by rotation of the discs 162, 163 and the said knife 145 serves a strip or ribbon 190 of curd from the block 106, the strip 190 being of substantially the same length as the block 106 and being caused to fall downwardly over the lower stop member 155 into the skip bucket 185 of the skip hoist 175.

The curd strip 190 is then elevated by the skip hoist 175 and is delivered into the vibratory conveyor 176 and then into the milling machine as previously described.

Further rotation of the discs 162, 163 causes the knife 145 and stop member 155 to be raised to the positions shown in FIGURES 2 and 4, the tiltable frame 25 being maintained in the tilted position shown in FIGURE 3.

The curd block 106 then slides forward a further distance equivalent to the thickness of the curd strip 190 until the side face of the curd block 106 again engages the stop member 155. The knife 145 is again lowered to sever another strip 190 from the curd block, and this process is repeated until the whole of the curd block 106 has been sub-divided into curd strips 190 which have been in turn elevated by the skip hoist 175 to the vibratory conveyor 176, and in turn delivered by the said conveyor 176 to the milling machine.

The air cylinder 60 is then operated to lower the tiltable frame 25 to its horizontal position, the safety mechanisms having been first disengaged, and the empty tray 105 is removed from the tiltable frame 25 and another full tray is moved onto the tiltable frame 25 from the conveyer 108. The tiltable frame 25 is again elevated to its inclined position by the cylinder 60 and severing of curd strips from the curd block in the tray is recommenced.

After passing through the milling machine, the curd may be subjected to salting, weighing and packing operations.

Although certain features of the invention have been set forth with particularity in order to fully describe the invention, various modifications within the skill of the art are contemplated.

Various of the features of the invention are set forth in the following claims.

What is claimed is:

1. A method of removing strips from a block of cheese curd comprising containing the block along a pair of opposing side surfaces, exposing the ends of a segment of the block extending generally normal to the side surfaces thereof at one end, causing a containing member to engage each of the exposed ends of the segment, applying pressure to the segment in directions normal to the exposed ends of the segment by means of the containing members to shape the segment and at least partially contain the same, and severing a portion of the segment from the remainder thereof by means of a knife extending normal to the side surfaces to form a strip while continuing to apply pressure by means of the containing members.

2. A method in accordance with claim 1, wherein the segment is also contained during severing along a third surface which is generally vertically disposed and normal to the said opposing side surfaces.

3. A method in accordance with claim 2, wherein the block is inclined so as to locate the segment at the lowermost edge thereof during severing, thereby subjecting the segment to the weight of the remainder of the block during severing.

4. A method in accordance with claim 1, wherein the segment is supported from beneath during severing.

5. A method of providing strips of cheese curd comprising depositing a quantity of curd in an open-topped receptacle having a bottom wall and side walls containing the curd, compressing and compacting the curd within the receptacle to form a block, exposing one side of the contained block by displacing one side wall of the receptacle, tilting the receptacle and shifting the block relative to the receptacle so as to cause a segment of the block to project outwardly of the receptacle along the lower open side thereof, and severing a strip of curd from the projecting segment while at least partially containing the segment along a bottom edge portion of the segment.

6. An apparatus for handling a block of cheese curd, which apparatus comprises an open-topped receptacle having a bottom wall and side walls for containing the block of cheese curd on all sides but one, means for effecting pivotal movement of said receptacle from a position in which its bottom wall is generally horizontal to a position in which its bottom wall is inclined so that the one side of the receptacle is lowermost, the angle of inclination of said bottom wall being sufficient to cause the block of curd to shift within the receptacle toward and out the one side thereof, stop means for arresting the shifting movement of the curd block, and means for severing a strip of curd from the portion of the block projecting out of the one side of the receptacle.

7. An apparatus for handling cheese curd in accordance with claim 6, wherein said receptacle includes a side wall movable between a position adjacent the one side of the receptacle to contain the curd block therein and an out-of-the-way position to permit passage of the block out the one side of the receptacle.

8. An apparatus in accordance with claim 6, wherein means are provided for supporting from beneath that portion of the curd block which projects outwardly of the receptacle.

9. An apparatus in accordance with claim 6, wherein said severing means is a guillotine knife adapted for vertical reciprocating movement, and wherein said stop means is raised and lowered with the guillotine knife.

10. An apparatus in accordance with claim 6, wherein said severing means is a guillotine knife adapted for vertical reciprocating movement and wherein means are provided defining an axis approximately in the plane of and beneath said guillotine knife about which said receptacle pivots.

11. An apparatus in accordance with claim 6, wherein restraining means are provided for engaging the end faces of the portion of the curd block which projects from the receptacle, said restraining means comprising vertical plates and means for moving such plates inwardly to engage the curd block prior to the severing thereof and for withdrawing the plates after the severing has been completed.

12. An apparatus in accordance with 6 wherein a tiltable frame is provided for supporting said receptacle, said frame being open at both ends, the full receptacle being introduced into said frame at one end and being withdrawn from the said frame at the other end when empty.

13. An apparatus in accordance with claim 12 wherein rollers are provided on one of said forming receptacle and tracks engageable by said rollers are provided on the other of said frame and receptacle.

14. An apparatus in accordance with claim 6 wherein ratchet means are provided for supporting the said receptacle in the inclined position.

References Cited

UNITED STATES PATENTS

| 119,733 | 10/1871 | Armerling | 146—159 |
| 461,405 | 10/1891 | Crosby | 146—159 |
| 465,891 | 12/1891 | Schmidt | 146—159 X |
| 2,130,646 | 9/1938 | Janke | 31—20 |

SAMUEL KOREN, *Primary Examiner.*

HUGH R. CHAMBLEE, *Examiner.* end plates 150 (see FIGURE 5) which extend parallel to the knife 145. Female guide members 151 are secured to the longitudinal end plates 150 and are in sliding engagement with fixed male guide members 152 secured to the vertical plates 127, 128. The knife or cutting blade 145 is thus guided in its up and down movement in the tiltable frame 25. The knife 145 when in its uppermost position as shown in FIGURE 4 is clear of the curd block 106, and when the knife is in its lowermost position the lower cutting edge of said knife passes downwardly through the slot 139.

A stop member 155 is secured at its ends to the transverse end members 148, 149 of the knife assembly and is transversely adjustable by means of slots 156 formed in the end plates 148, 149. The stop member 155 is disposed so as to engage and arrest the curd block 106 when the latter is moved transversely within and from the tray 105. The distance between the inner face of the stop member 155 and the position occupied by the knife 145 when the latter is lowered represents the thickness or width of the strip 190 or ribbon of curd which is severed from the block 106, and the stop member 155 is adjusted so as to ensure the production of curd strips of the desired width or thickness.

The stop member 155, being secured to the knife assembly, is raised and lowered with such assembly. Thus when the knife assembly is in its raised position as shown in FIGURES 2 and 4, the stop member 155 is located so as to engage and arrest the curd block 106. When the knife assembly is lowered to the position shown in FIGURE 3, the stop member 155 is also lowered and the strip 190 or ribbon of curd severed from the block 106 is thus permitted to fall downwardly over the stop member 155 into the skip bucket as hereinafter described.

The mechanism for raising and lowering the knife assembly comprises a pair of connecting rods 160, 161, the lower ends of which are pivoted to the knife assembly and the upper ends of which are pivoted to discs 162, 163 which are secured to a shaft 164 rotatably mounted in bearings 165 secured to the vertical members 125, 126 and in bearings 166 (FIG. 1) secured to the transverse members 75, 76. The shaft 164 is rotated by means of an electric motor 167 which is connected by a coupling 168 to a reduction gear box 169 and the latter is drivably connected to the shaft 164 by pulleys 170, belts 171 and pulleys 172. A chain drive may be employed in lieu of the belt drive, if desired.

Rotation of the discs 162, 163 by the electric motor 167 causes the knife assembly to be reciprocated between its upper position in which the curd block 106 is free to move beneath the knife 145 and against the stop member 155, and its lower position in which the knife 145 severs a strip 190 or ribbon of curd from the block 106.

A skip hoist 175 is provided for elevating the strips or ribbons of curd which are severed from the curd block 106 by the knife 145, the curd strips 190 being delivered by the skip hoist 175 onto a vibratory conveyor 176. The skip hoist 175 comprises a frame 177 on which are supported two pairs of inclined parallel channel-section tracks 178, 179. The upper inclined tracks 178 are provided with abutments or stops 180 at their lower ends (FIG. 4) and their upper ends are curved upwardly as indicated at 181 (FIG. 3). The upper ends of the inclined tracks 179 are curved away from the inclined tracks 178 to form approximately horizontal sections 182, the ends of which are closed as shown at 183.

A skip bucket 185 which extends the full width of the skip hoist 175 and of the curd block 106 is mounted on the inclined tracks 178, 179 so as to be capable of reciprocating movement between a lower position indicated in FIGURES 2 and 4, and an upper position indicated in FIGURE 3.

The skip bucket 185 is provided on each side with rollers 186 which run in the inclined tracks 178 and with rollers 187 which run in the inclined tracks 179. The skip bucket 185 is raised by cables 188 which are secured at 189 to the sides of the skip bucket 185 and are actuated by a winch mechanism (not shown).

When the skip bucket 185 is in its lowermost position as indicated in FIGURES 2 and 4, the curd strip or ribbon 190 which is severed from the curd block 106 by the knife 145 falls over the stop member 155 into the skip bucket 185, which is then elevated by the cables 188. When the skip bucket 185 reaches the upper end of the inclined tracks 178, 179, the rollers 186 are caused to move upwardly owing to the curved shape 181 of the tracks 178 and to the forces exerted on the skip bucket 185 by the cables 188. The rollers 187 are constrained to move into the substantially horizontal extensions 182 of the tracks 179 and are arrested by the closed ends 183 of the extensions 182. Further upward movement of the cables 188 then causes the skip bucket 185 to be pivoted about the axis of the rollers 187 so as to tilt the skip bucket 185 to the tipping position as indicated in FIGURE 3. In this position the curd strip 190 is caused to slide downwardly over the inclined portion 191 of the skip bucket 185 onto the vibratory conveyor 176. The tension on the cables is then relaxed to permit the skip bucket 185 to return to its previous position so that the rollers 186 engage the tracks 178 and the skip bucket 185 is then lowered along the inclined tracks 178, 179 until it again reaches the lowermost position to receive the next curd strip 190 which is severed from the curd block 106.

The vibratory conveyor 176 comprises a trough 195 which is slightly inclined from its entry to its exit end, that is from left to right as viewed in FIGURE 10. The trough 195 is resiliently supported on arms 196 which are pivoted to a ballast frame 197 which is supported by means of resilient mountings 198 on a fixed frame 199. The trough 195 is vibrated by means of an impulser 200. The curd strips 190 which are delivered into the trough 195 of the vibratory conveyor 176 are caused to move along said conveyor 176 from its entry end to its exit end and are delivered by said conveyor into a milling machine (not shown).

The vibratory conveyor 176 is so constructed that curd strips 190 delivered intermittently to the conveyor 176 by the skip hoist 175 are brought together on the conveyor 176 before reaching the exit end thereof so that a continuous length of curd is fed to the milling machine.

In the operation of the apparatus, a tray 105 containing a block 106 of cheddared curd is moved onto the rollers 39 of the tiltable frame 25 from the roller conveyor 108 while the tiltable frame 25 is in its lowermost or horizontal position as indicated in FIGURES 2 and 4, the hinged wall 115 of the tray 105 being swung upwardly to its open position before the tray 105 is moved onto the tiltable frame 25. The air cylinder 60 is then actuated to raise the tiltable frame 25 to its uppermost or tilted position as shown in FIGURE 3, the frame 25 being supported in this position by the air cylinder 60 and also by the safety mechanism previously described.

In this position the curd block 106 is caused to slide transversely within the tray 105 through the open side thereof until the face of the block 106 engages the stop member 155. The angle of inclination of the tiltable frame 25 is so determined that the sliding movement of the curd block 106 in the tray 105 takes place at the required rate and the curd block 106 maintains its shape and position in the tray 105 after its movement has been arrested by engagement with the stop member 155. The lower surface of the curd block 106 is guided during its transverse sliding movement by the guide plate 136 and curd support 138 which, as previously mentioned, are disposed in alignment with the floor 109 of the curd tray 105, and the end faces of the portion of the curd block 106 which projects through the open side of the tray 105 are maintained in substantial alignment with the end